(12) United States Patent  
Yasunobe

(10) Patent No.: US 10,328,798 B2  
(45) Date of Patent: Jun. 25, 2019

(54) WORK VEHICLE

(71) Applicant: KUBOTA CORPORATION, Osaka (JP)

(72) Inventor: Daisuke Yasunobe, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/277,174

(22) Filed: Sep. 27, 2016

(65) Prior Publication Data

US 2017/0088202 A1  Mar. 30, 2017

(30) Foreign Application Priority Data

Sep. 29, 2015 (JP) .................. 2015-192058

(51) Int. Cl.
*B60K 20/02* (2006.01)
*G05G 13/00* (2006.01)
(Continued)

(52) U.S. Cl.
CPC .............. *B60K 20/02* (2013.01); *B60K 20/08* (2013.01); *F16H 61/24* (2013.01); *F16H 63/38* (2013.01); *G05G 1/01* (2013.01); *G05G 1/04* (2013.01); *G05G 5/06* (2013.01); *G05G 13/00* (2013.01); *B60Y 2200/22* (2013.01); *B60Y 2200/221* (2013.01); *F16H 2061/247* (2013.01); *G05G 2505/00* (2013.01); *G05G 2700/18* (2013.01); *Y10T 74/2011* (2015.01); *Y10T 74/20636* (2015.01)

(58) Field of Classification Search
CPC ........ B60K 20/02; B60K 20/08; G05G 13/00; G05G 1/01; G05G 1/04; G05G 5/06; G05G 2700/18; G05G 2505/00; B60Y 2200/221; B60Y 2200/22; F16H 59/10; F16H 59/0204; F16H 61/22; F16H 61/24; F16H 2061/247; F16H 2059/047; F16H 63/38; Y10T 74/20098; Y10T 74/20085; Y10T 74/2011; Y10T 74/20636
USPC .................. 180/315; 74/473.21, 473.25, 527
See application file for complete search history.

(56) References Cited

U.S. PATENT DOCUMENTS

| 4,216,680 A * | 8/1980 | Hayashi | F16H 3/08 |
| | | | 74/473.33 |
| 4,690,011 A * | 9/1987 | Sakai | B60T 1/005 |
| | | | 192/218 |
| 2005/0223834 A1* | 10/2005 | Otsuka | F16H 59/0204 |
| | | | 74/473.18 |

FOREIGN PATENT DOCUMENTS

| JP | 10-157477 | * | 6/1998 |
| JP | 2002293152 A | * | 10/2002 |

(Continued)

*Primary Examiner* — Keith J Frisby
(74) *Attorney, Agent, or Firm* — Greenblum & Bernstein, P.L.C.

(57) ABSTRACT

Work vehicle includes an operation lever pivoting forward and backward stepwise through a plurality of operation positions; and a detent type retention mechanism holding the operation lever in each of the operation positions. The retention mechanism includes a coupling member coupled to the operation lever; and a retention member holding the operation lever via the coupling member. The operation lever and the retention mechanism are provided separately from each other, aligned in a direction intersecting with a pivot support shaft of the operation lever. The operation lever and the coupling member are reciprocally connected via a linking mechanism.

17 Claims, 11 Drawing Sheets

(51) Int. Cl.
    *G05G 1/01*           (2008.04)
    *G05G 1/04*           (2006.01)
    *G05G 5/06*           (2006.01)
    *F16H 61/24*          (2006.01)
    *F16H 63/38*          (2006.01)
    *B60K 20/08*         (2006.01)

(56) References Cited

FOREIGN PATENT DOCUMENTS

| | | | |
|---|---|---|---|
| JP | 2004-190697 | * | 7/2004 |
| JP | 2008232223 A | * | 10/2008 |

* cited by examiner

Fig. 5

(Forward travel status)

| Operation position of speed change lever | Main speed change mechanism | | | | Auxiliary speed change mechanism | | Fwd travel speed change mechanism | | Speed change status of main speed change module |
|---|---|---|---|---|---|---|---|---|---|
| | Sp1 | Sp2 | Sp3 | Sp4 | Low | High | Low | High | |
| Speed 1 position | O | | | | O | | O | | Fwd speed 1 |
| Speed 2 position | O | | | | O | | | O | Fwd speed 2 |
| Speed 3 position | | O | | | O | | O | | Fwd speed 3 |
| Speed 4 position | | O | | | O | | | O | Fwd speed 4 |
| Speed 5 position | | | O | | O | | O | | Fwd speed 5 |
| Speed 6 position | | | O | | O | | | O | Fwd speed 6 |
| Speed 7 position | | | | O | O | | O | | Fwd speed 7 |
| Speed 8 position | | | | O | O | | | O | Fwd speed 8 |
| Speed 9 position | O | | | | | O | | O | Fwd speed 9 |
| Speed 10 position | | O | | | | O | | O | Fwd speed 10 |
| Speed 11 position | | | O | | | O | | O | Fwd speed 11 |
| Speed 12 position | | | | O | | O | | O | Fwd speed 12 |

Fig. 6

(Reverse travel status)

| Operation position of speed change lever | Main speed change mechanism | | | | Auxiliary speed change mechanism | | Fwd travel speed change mechanism | | Speed change status of main speed change module |
|---|---|---|---|---|---|---|---|---|---|
| | Sp1 | Sp2 | Sp3 | Sp4 | Low | High | Low | High | |
| Speed 1 position | O | | | | O | | — | — | Reverse speed 1 |
| Speed 2 position | O | | | | O | | — | — | |
| Speed 3 position | | O | | | O | | — | — | Reverse speed 2 |
| Speed 4 position | | O | | | O | | — | — | |
| Speed 5 position | | | O | | O | | — | — | Reverse speed 3 |
| Speed 6 position | | | O | | O | | — | — | |
| Speed 7 position | | | | O | O | | — | — | Reverse speed 4 |
| Speed 8 position | | | | O | O | | — | — | |
| Speed 9 position | O | | | | | O | — | — | Reverse speed 5 |
| Speed 10 position | | O | | | | O | — | — | Reverse speed 6 |
| Speed 11 position | | | O | | | O | — | — | Reverse speed 7 |
| Speed 12 position | | | | O | | O | — | — | Reverse speed 8 |

WORK VEHICLE

CROSS-REFERENCE TO RELATED APPLICATIONS

The present application claims priority under 35 U.S.C. § 119 of Japanese Application No. 2015-192058, filed on Sep. 29, 2015, the disclosure of which is expressly incorporated by reference herein in its entirety.

BACKGROUND OF THE INVENTION

1. Field of the Invention

The present invention relates to a work vehicle which includes an operation lever pivoting forward and backward stepwise through a plurality of operation positions and a detent type retention mechanism holding the operation lever in each of the operation positions.

2. Description of Related Art

One example of such a work vehicle is a tractor described in Japanese Patent Laid-open Publication No. 2004-190697 (paragraphs [0027] to [0031], FIGS. 5, 7, and 8). The tractor includes, for example, a hand shift type operation lever (speed change lever), a lever support member supporting the operation lever such that the operation lever can pivot left and right via a second support shaft oriented in a front/back direction, and a support bracket supporting the lever support member such that the lever support member can pivot forward and backward via a first support shaft oriented in a left/right direction. The operation lever and the lever support member pivot integrally forward and backward with respect to the support bracket.

In addition, in the tractor, the support bracket includes a left wall having a fan shape in a lateral view and provided fixated to a left rear wheel fender. A plurality of engagement recesses corresponding to each operation position of the operation lever are provided on a top edge of the left wall. The lever support member includes, at a top end, a swing arm biased by a spring to swing downward around a support shaft oriented in the left/right direction. The swing arm includes an engagement pin on a free end. Accordingly, when the operation lever is operated to a desired operation position, the operation lever-side engagement pin fits into the engagement recess, of the plurality of engagement recesses provided to the support bracket, which corresponds to the operation position of the operation lever, and the operation lever is held at the desired operation position.

In other words, in the tractor described in Japanese Patent Laid-open Publication No. 2004-190697, the hand shift type operation lever and the detent type retention mechanism holding the operation lever in each of the operation positions are arranged so as to be aligned in the left/right direction and are integrally configured by the hand shift type operation lever, the lever support member pivoting forward and backward integrally with the operation lever, the left wall of the support bracket which includes the plurality of engagement recesses, and the swing arm provided to the lever support member, for example.

In the above-noted configuration, there is an increase in a left/right direction width of a stepwise position retaining type lever module configured by the operation lever and detent type retention mechanism, for example, which requires a space that is broad in the left/right direction as an installation space for the lever module. Therefore, an installation location of the stepwise position retaining type lever module is limited to locations having a broad space in the left/right direction, and there is room for improvement in teens of improving a degree of freedom in installing the various operation levers.

Specifically, development of a stepwise position retaining type lever module having favorable improvement of the degree of freedom in installation of various operation levers is desired.

SUMMARY OF THE INVENTION

In order to address the above-noted issue, a work vehicle according to non-limiting embodiments of the present invention can include an operation lever pivoting forward and backward stepwise through a plurality of operation positions; and a detent type retention mechanism holding the operation lever in each of the operation positions. The retention mechanism includes a coupling member coupled to the operation lever; and a retention member holding the operation lever via the coupling member. The operation lever and the retention mechanism are provided separately from each other, aligned in a direction intersecting with a pivot support shaft of the operation lever. The operation lever and the coupling member are reciprocally connected via a linking mechanism.

According to this aspect of the invention, the operation lever and the retention mechanism are provided separately from each other, aligned in a direction intersecting with the pivot support shaft of the operation lever (for example, a front/back direction of a vehicle body or a vertical direction of the vehicle body). Therefore, the left/right direction width of the stepwise position retaining type lever module configured by the operation lever and the retention mechanism can be narrowed in comparison to a configuration where the operation lever and the retention mechanism are provided integrally aligned in the left/right direction.

In addition, in comparison to a case where the operation lever and the retention mechanism are configured to be integral, a degree of freedom in placement of the operation lever and the retention mechanism is increased. Accordingly, in a case where the operation lever and the retention mechanism are provided together, collected in a predetermined console together with a second operation lever, for example, even when a sufficiently broad space cannot be ensured to allow the operation lever to be provided integrally with the retention mechanism in the predetermined console due to equipment such as the second operation lever, by ensuring sufficient space to allow the operation lever and the retention mechanism to be provided separately, the operation lever and the retention mechanism can be provided together, collected in the predetermined console together with the second operation lever and the like.

In addition, even when the operation lever and the retention mechanism are provided separately, the operation lever and the coupling member of the retention mechanism are reciprocally connected via the linking mechanism, and therefore the retention mechanism is capable, via the linking mechanism, of stepwise retention of the operation lever at each of the operation positions.

As a result, a stepwise position retaining type lever module having favorable improvement of a degree of freedom in installation of various operation levers can be provided.

Another aspect of the present invention positions a driver's seat between left and right rear fenders, and provides the operation lever and retention mechanism separately from each other, aligned in a front/back direction between the driver's seat and one of the left and right rear fenders.

According to this aspect, the operation lever and the retention mechanism can be provided to a narrow space between the driver's seat and one of the left and right rear fenders without difficulty and without inconvenience that may arise in a case where the operation lever and the retention mechanism are provided separately, aligned in the vertical direction, such as a space at a driver's feet becoming narrowed and cramped due to the retention mechanism being provided below the operation lever.

According to another aspect of the present invention, an operation direction of the operation lever is defined as a direction oriented forward and outward, moving further outward laterally from the vehicle body as the operation lever is operated toward the front of the vehicle body.

According to this aspect, operation of the operation lever while seated in the driver's seat is facilitated as compared to a case where the operation direction of the operation lever is defined in the front/back direction along the front/back direction of the vehicle body.

In other words, operability of the operation lever can be improved.

According to another aspect of the present invention, the operation lever is of a finger shift type, which has a short extension length from the pivot support shaft, and the operation lever is provided with a narrowly defined pivot range.

According to this aspect, compared to a case where the operation lever is of a hand shift type having a long extension length from the pivot support shaft, or a case where the pivot range is defined broadly, reduction in a size of the operation lever is possible, and the space required for installation of the operation lever can be narrowed.

As a result, the degree of freedom in placing the operation lever can be improved.

According to another aspect of the present invention, the coupling member has an extension length from a pivot support shaft of the coupling member that is defined to be short, having a length similar to the extension length of the operation lever from the pivot support shaft of the operation lever. The retention mechanism includes a plurality of lever holding recesses formed on the coupling member or the retention member and corresponding to the plurality of operation positions, and a spacing between the recesses is defined to be short in accordance with a pivot range of the operation lever.

According to this aspect, compared to a case where the retention mechanism accommodates the hand shift model operation lever or the operation lever having a broad pivot range, reduction in the size of the retention mechanism is possible, and the space required for installation of the retention mechanism can be narrowed.

As a result, the degree of freedom in placing the retention mechanism can be improved.

According to another aspect of the present invention, a friction applying mechanism is provided applying frictional resistance to operation of the operation lever.

According to this aspect, an unnecessarily rapid operation of the operation lever can be prevented. Therefore, for example, a step-skipping operation of the operation lever can be prevented with respect to a retention mechanism in which the interval between each of the lever holding recesses is reduced. Such a step-skipping operation may occur in a case where the operation lever is operated rapidly.

Specifically, an incorrect operation of the operation lever caused by reduction in size of the retention mechanism can be prevented.

According to another aspect of the present invention, a rotation type potentiometer is provided which detects the operation position of the operation lever. The potentiometer is provided at a height position where a detection shaft of the potentiometer is located above the pivot support shaft of the operation lever. A detection arm swingably coupled to the operation lever is fixated to the detection shaft.

According to this aspect, an operation angle of the detection arm relative to the operation angle of the operation lever can be increased as compared to a case where the detection shaft of the potentiometer and the pivot support shaft of the operation lever are provided coaxially. Thus, an amount of change in a voltage value, which changes accompanying modification of the operation position of the operation lever, can be increased.

As a result, the position of the operation lever can be accurately detected using the potentiometer while reducing the size of the operation lever.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 illustrates a relationship between an operation position of the main speed change lever and a speed change status of a main speed change module in a forward travel state;

FIG. 6 illustrates a relationship between the operation position of the main speed change lever and the speed change status of the main speed change module in a reverse travel state;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment applying the present invention to a tractor, as an example of a work vehicle, is described with reference to the drawings as an exemplary embodiment of the present invention.

Figure 1:
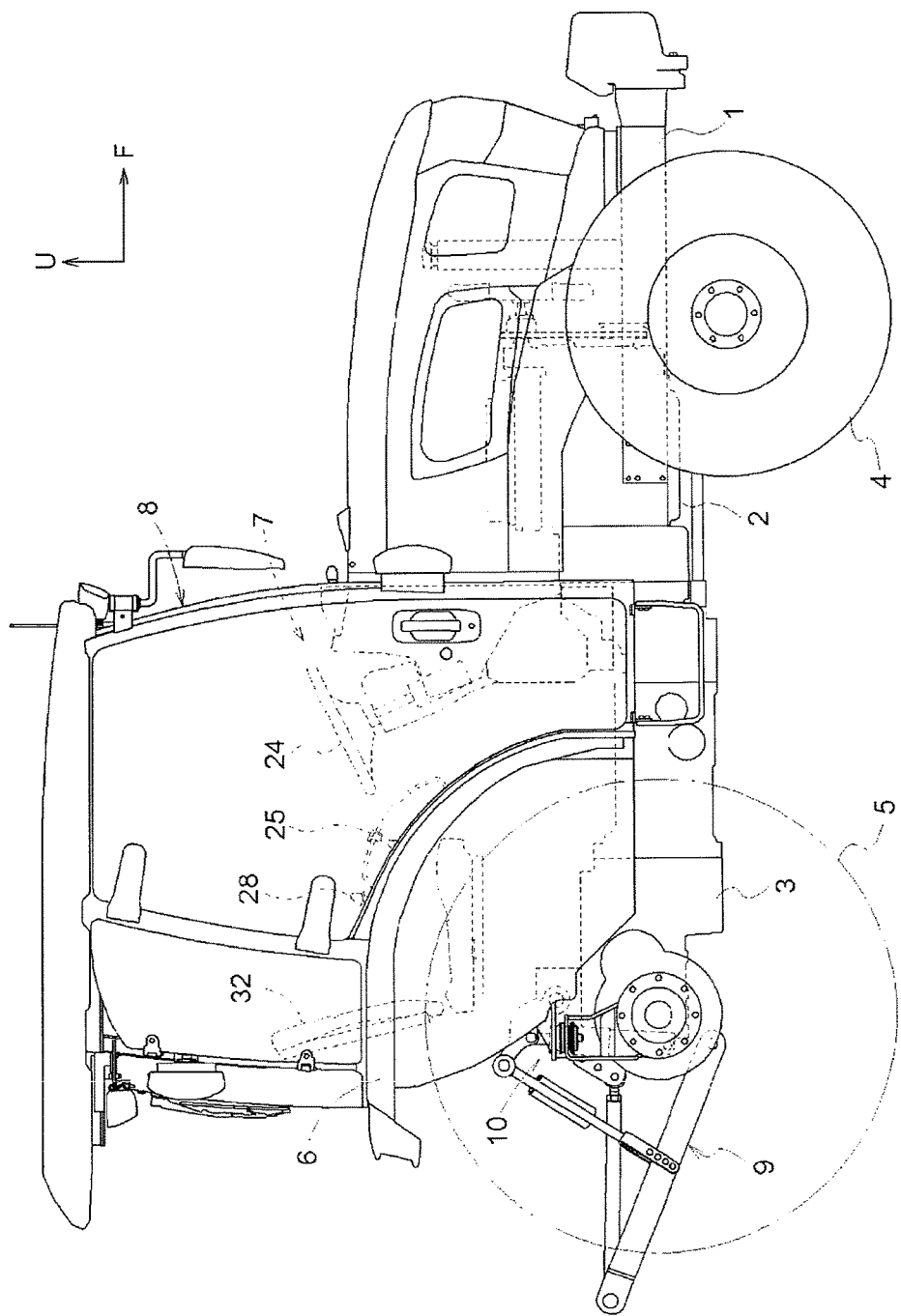
FIG. 1 is a right side view of a tractor.

In FIG. 1, a direction indicated by an arrow with reference symbol F is toward a front of the tractor, and a direction indicated by an arrow with reference symbol U is upward of the tractor.

As shown in FIG. 1, the tractor exemplifying the present embodiment includes, for example, a front frame 1 positioned on a front portion of a vehicle body; an engine 2 coupled to a rear portion of the front frame 1; a housing module 3 joined to a bottom portion at a rear end of the engine 2; left and right front wheels 4 positioned on a left and right of the front frame 1; left and right rear wheels 5 positioned on the left and right of the housing module 3; left and right rear fenders 6 covering the left and right rear wheels 5; a riding-type cockpit 7 positioned on a rear portion of the vehicle body; and a cabin 8 covering the cockpit 7.

Figure 2:
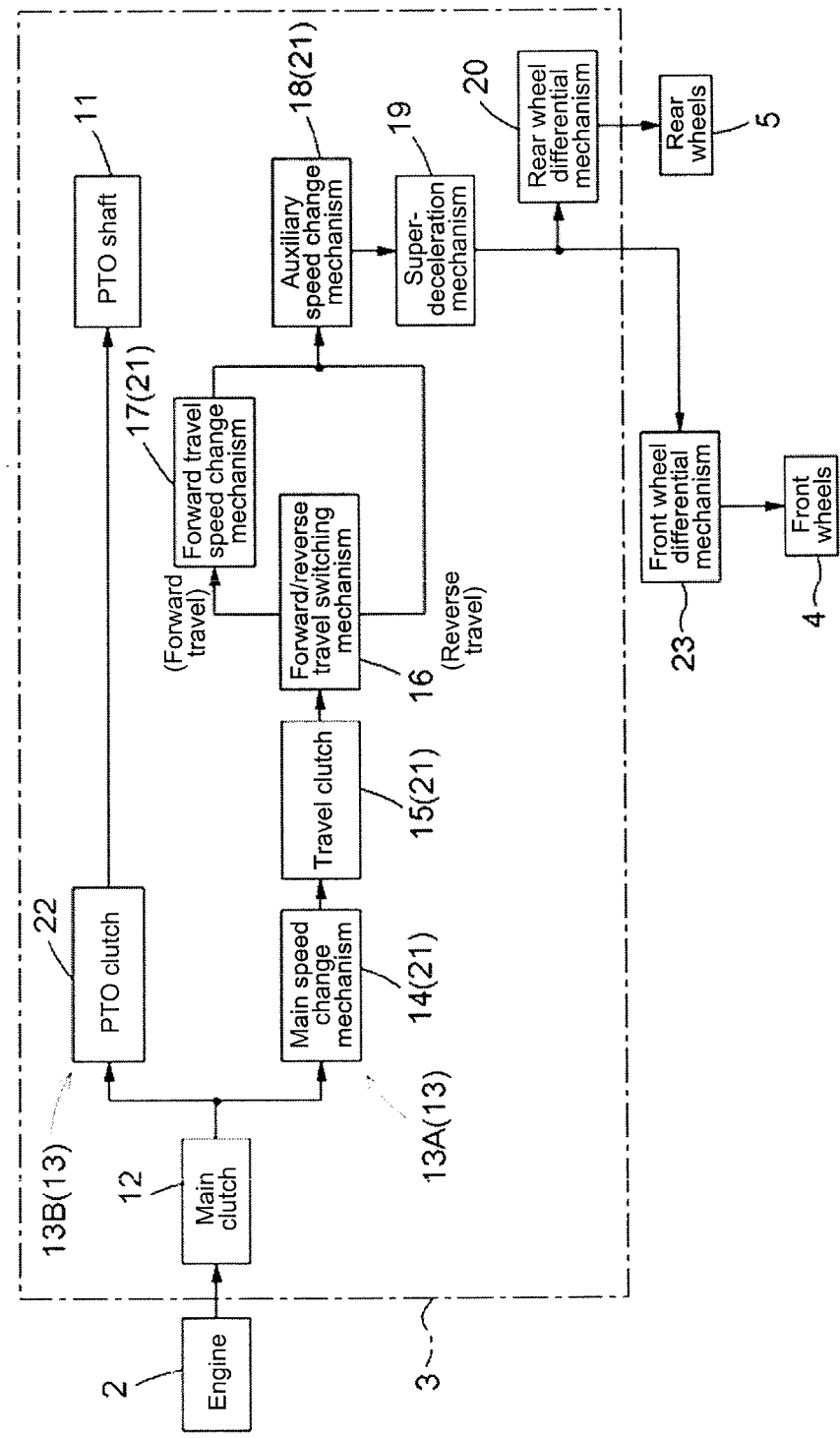
FIG. 2 is a block diagram illustrating a transmission structure of the tractor.

As shown in FIGS. 1 and 2, the tractor includes, on a rear portion of the housing module 3, a link mechanism 9 to couple a work apparatus; an electronic hydraulic control type lift apparatus 10 driving the work apparatus (not shown in the drawings) to lift and lower via the link mechanism 9; and a PTO shaft 11 enabling work drive power to be output to the work apparatus.

As shown in FIG. 2, a primary clutch 12 interrupting drive power from the engine 2, a gear type speed change apparatus 13 speed-changing the drive power from the primary clutch 12, and the like are installed in the housing module 3. The gear type speed change apparatus 13 includes a travel transmission system 13A transmitting drive power from the engine 2 to the left and right front wheels 4 and the left and right rear wheels 5; and a work transmission system 13B transmitting drive power from the engine 2 to the PTO shaft 11.

The travel transmission system 13A includes, for example, an electronic hydraulic control type main speed change mechanism 14 capable of four speed change stages; an electronic hydraulic control type travel clutch 15 interrupting drive power after speed change by the main speed change mechanism 14; a forward/reverse travel switching mechanism 16 switching the drive power from the travel clutch 15 between use in forward travel and use in reverse travel; an electronic hydraulic control type forward travel speed change mechanism 17 speed-changing the forward travel drive power from the forward/reverse travel switching mechanism 16 to one of two stages, high or low; an electronic hydraulic control type auxiliary speed change mechanism 18 speed-changing one of the forward travel drive power, after speed change by the forward travel speed change mechanism 17, and the reverse travel drive power from the forward/reverse travel switching mechanism 16 to one of two stages, high or low; a super-deceleration mechanism 19 speed-changing the drive power after speed change by the auxiliary speed change mechanism 18 to one of two stages, high or low; and a rear wheel differential mechanism 20 relaying transmission to the left and right rear wheels 5 from the super-deceleration mechanism 19. In addition, the main speed change mechanism 14, the travel clutch 15, the forward travel speed change mechanism 17, and the auxiliary speed change mechanism 18 operate as a main speed change module 21. Transmission to the left and right front wheels 4 from the super-deceleration mechanism 19 is performed via a front wheel differential mechanism 23 or the like. The work transmission system 13B includes a PTO clutch 22 interrupting transmission to the PTO shaft 11.

Figure 3:
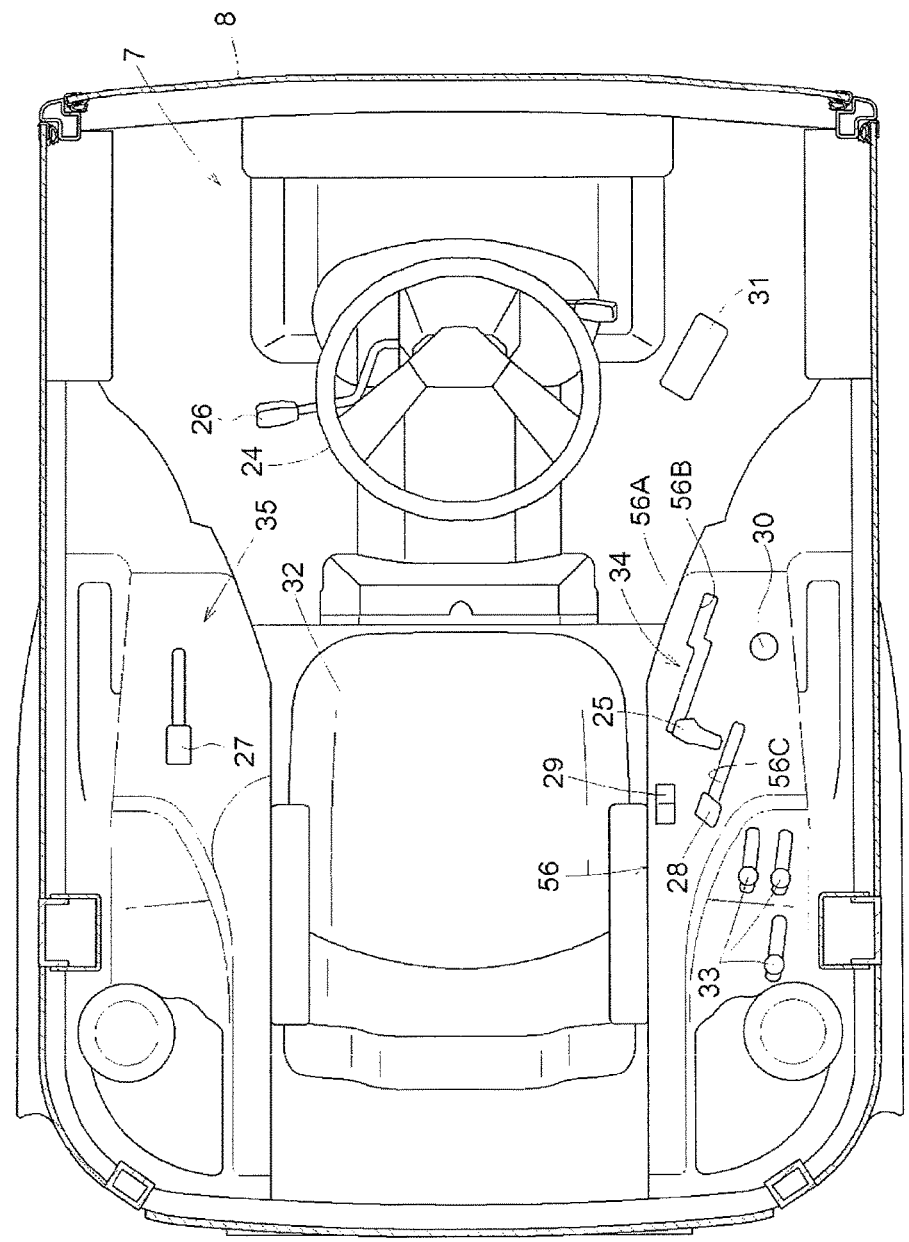
FIG. 3 is a lateral cross-sectional plan view of a cockpit.
Figure 4:
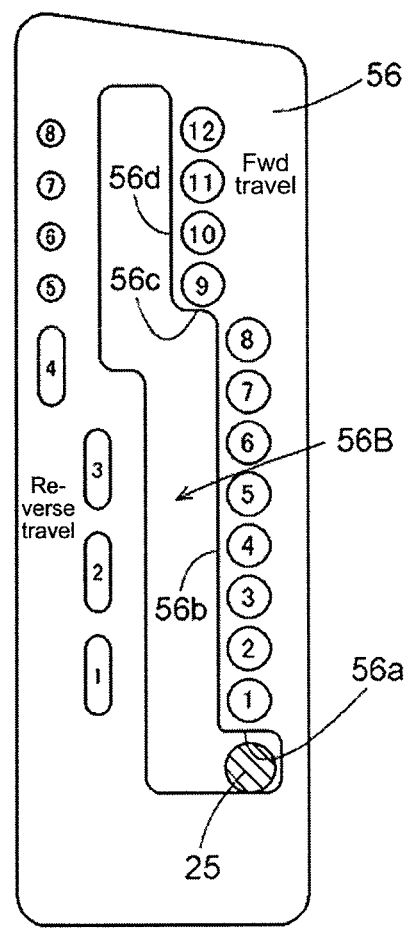
FIG. 4 is a plan view of relevant portions illustrating a shape of a first guide groove used with a main speed change lever.
Figure 7:
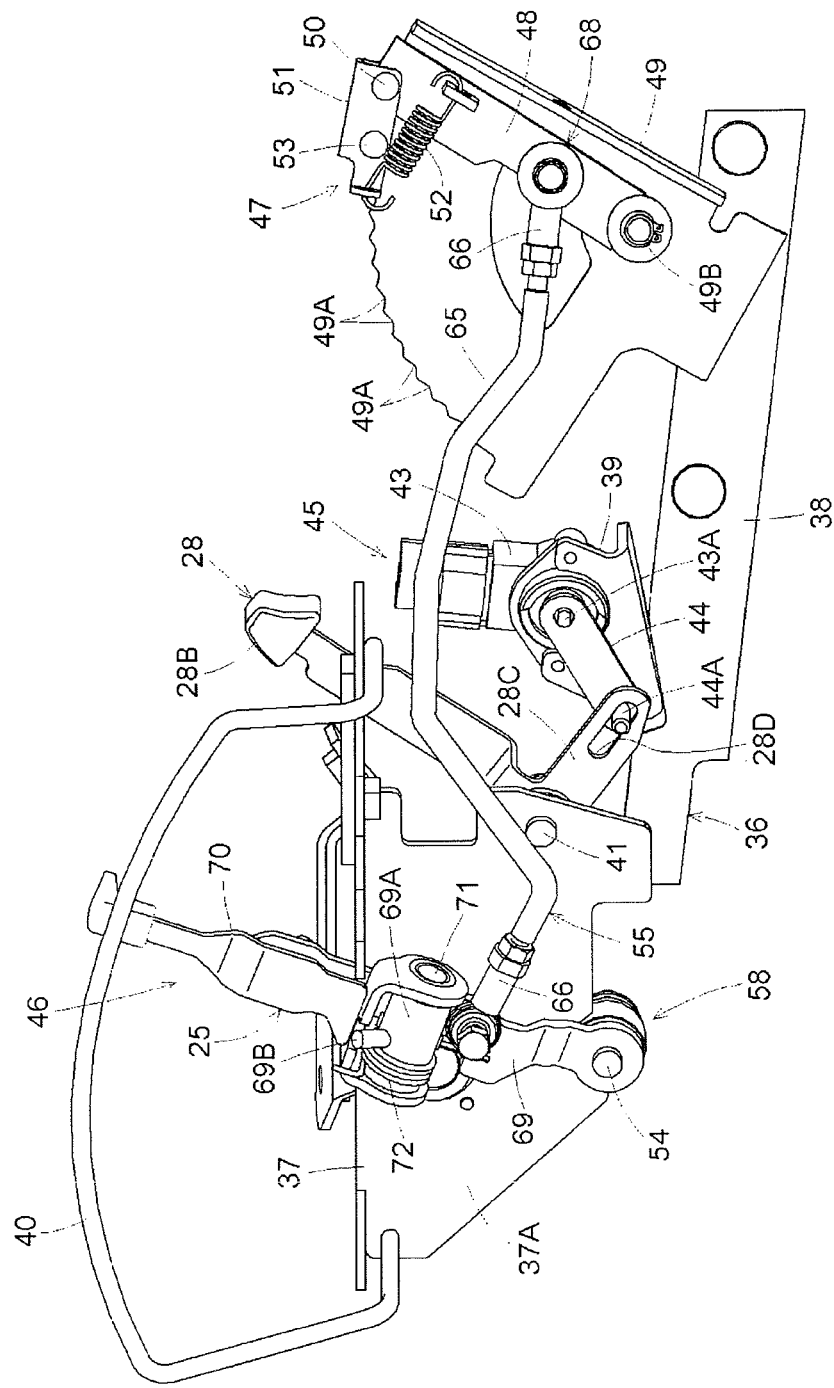
FIG. 7 is a left side view of relevant portions illustrating a configuration of a stepless position retaining type first lever module and a stepwise position retaining type second lever module.
Figure 8:
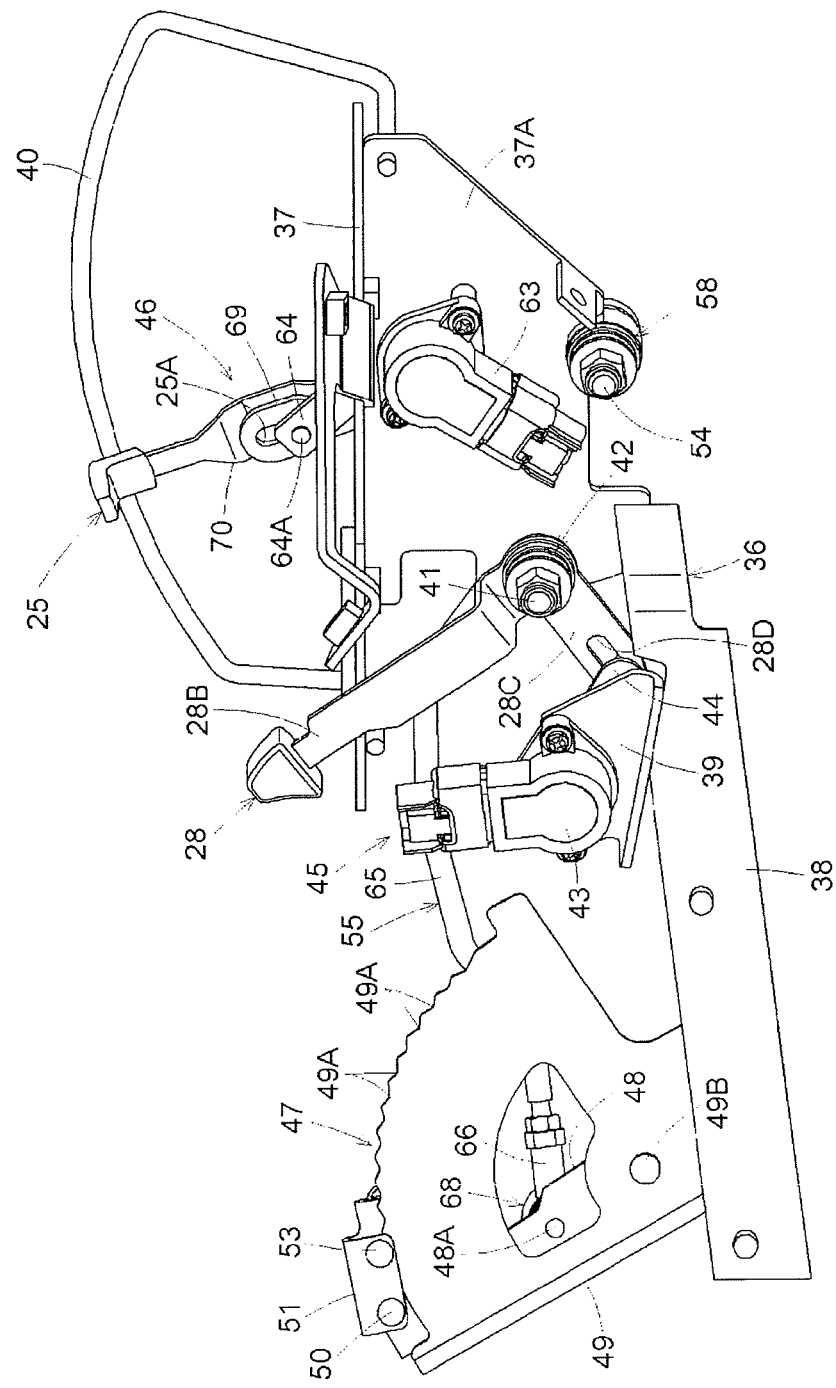
FIG. 8 is a right side view of relevant portions illustrating the configuration of the stepless position retaining type first lever module and the stepwise position retaining type second lever module.
Figure 9:
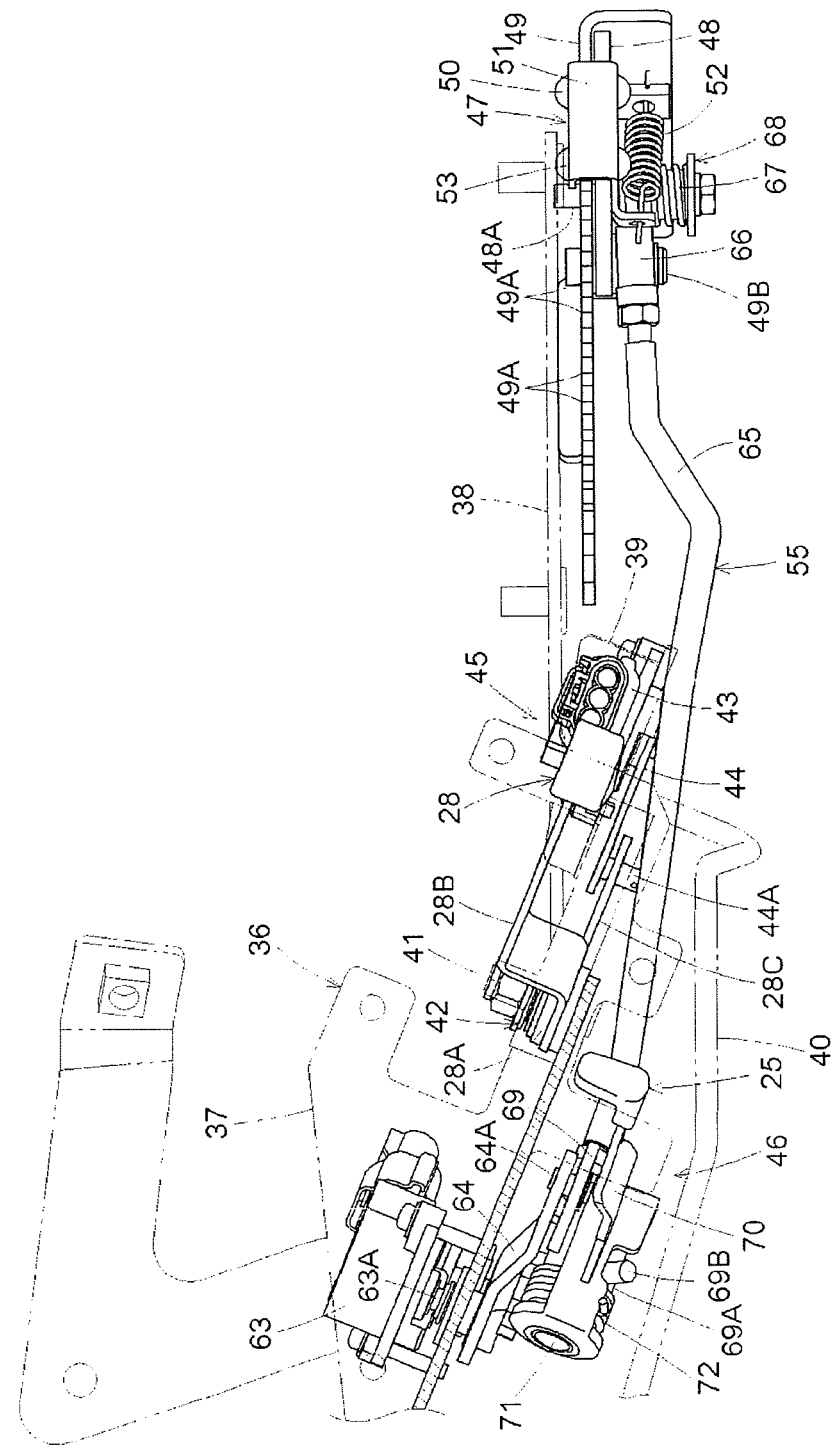
FIG. 9 is a plan view of relevant portions illustrating the configuration of the stepless position retaining type first lever module and the stepwise position retaining type second lever module.

With reference to FIGS. 1-3, the cockpit 7 includes, for example, a steering wheel 24 steering the front wheels 4; a main speed change lever 25 which is an operation lever of the main speed change module 21; a shuttle lever 26 which is an operation lever to switch between forward/reverse travel; a creep lever 27 which is an operation lever of the super-deceleration mechanism 19; a height setting lever 28 which is an operation lever of the lift apparatus 10; a lift switch 29 which is an operation member of the lift apparatus 10; a PTO switch 30 which is an operation member of the PTO clutch 22; an accelerator pedal 31; and a driver's seat 32 positioned between the right and left rear fenders 6.

Together with three auxiliary levers 33 used in work, whose operation is linked to three auxiliary control valves (not shown in the drawing) provided to the rear portion of the vehicle body and used in work, the main speed change lever 25, the height setting lever 28, the lift switch 29, and the PTO switch 30 are provided together, collected in a first console 34 provided at a location to the right of the driver's seat 32. Accordingly, while operating the steering wheel 24 with a left hand, a driver can perform operations on the main speed change lever 25 or the height setting lever 28, for example, with a right hand. In other words, operability of the steering wheel 24, the main speed change lever 25, and the like is improved.

The shuttle lever 26 is provided adjacent to the steering wheel 24, to the left of and below the steering wheel 24. The creep lever 27 is provided to a second console 35, which is provided at a location to the left of the driver's seat 32. The accelerator pedal 31 is provided on a floor portion positioned in a location forward and obliquely to the right of the driver's seat 32.

With reference to FIGS. 2 and 4 to 6, the main speed change module 21 is operated through a control operation of a control device (not shown in the drawings) based on operation of the main speed change lever 25, so as to obtain a speed change status at or below a level corresponding to an operation position of the main speed change lever 25. Referring to FIG. 5, when the main speed change lever 25 is operated to a speed 1 position, the main speed change module 21 is operated so as to obtain a speed 1 status of the main speed change mechanism 14, an ON status of the travel clutch 15, a low speed status of the auxiliary speed change mechanism 18, and a low speed status of the forward travel speed change mechanism 17. When the main speed change lever 25 is operated to a speed 2 position, the main speed change module 21 is operated so as to obtain the speed 1 status of the main speed change mechanism 14, the ON status of the travel clutch 15, the low speed status of the auxiliary speed change mechanism 18, and a high speed status of the forward travel speed change mechanism 17. When the main speed change lever 25 is operated to a speed 3 position, the main speed change module 21 is operated so as to obtain a speed 2 status of the main speed change mechanism 14, the ON status of the travel clutch 15, the low speed status of the auxiliary speed change mechanism 18, and the low speed status of the forward travel speed change mechanism 17. When the main speed change lever 25 is operated to a speed 4 position, the main speed change module 21 is operated so as to obtain the speed 2 status of the main speed change mechanism 14, the ON status of the travel clutch 15, the low speed status of the auxiliary speed change mechanism 18, and the high speed status of the forward travel speed change mechanism 17. When the main speed change lever 25 is operated to a speed 5 position, the main speed change module 21 is operated so as to obtain a speed 3 status of the main speed change mechanism 14, the ON status of the travel clutch 15, the low speed status of the auxiliary speed change mechanism 18, and the low speed status of the forward travel speed change mechanism 17. When the main speed change lever 25 is operated to a speed 6 position, the main speed change module 21 is operated so as to obtain the speed 3 status of the main speed change mechanism 14, the ON status of the travel clutch 15, the low speed status of the auxiliary speed change mechanism 18, and the high speed status of the forward travel speed change mechanism 17. When the main speed change lever 25 is operated to a speed 7 position, the main speed change module 21 is operated so as to obtain a speed 4 status of the main speed change mechanism 14, the ON status of the travel clutch 15, the low speed status of the auxiliary speed change mechanism 18, and the low speed status of the forward travel speed change mechanism 17. When the main speed change lever 25 is operated to a speed 8 position, the main speed change module 21 is operated so as to obtain the speed 4 status of the main speed change mechanism 14, the ON status of the travel clutch 15, the low speed status of the auxiliary speed change mechanism 18, and the high speed status of the forward travel speed change mechanism 17. When the main speed change lever 25 is operated to a speed 9 position, the main speed change module 21 is operated so as to obtain the speed 1 status of the main speed change mechanism 14, the ON status of the travel clutch 15, a high speed status of the auxiliary speed change mechanism 18, and the high speed status of the forward travel speed change mechanism 17. When the main speed change lever 25 is operated to a speed 10 position, the main speed change module 21 is operated so as to obtain the speed 2 status of the main speed change mechanism 14, the ON status of the travel clutch 15, the high speed status of the auxiliary speed change mechanism 18, and the high speed status of the forward travel speed change mechanism 17. When the main speed change lever 25 is operated to a speed 11 position, the main speed change module 21 is operated so as to obtain the speed 3 status of the main speed change mechanism 14, the ON status of the travel clutch 15, the high speed status of the auxiliary speed change mechanism 18, and the high speed status of the forward travel speed change mechanism 17. When the main speed change lever 25 is operated to a speed 12 position, the main speed change module 21 is operated so as to obtain the speed 4 status of the main speed change mechanism 14, the ON status of the travel clutch 15, the high speed status of the auxiliary speed change mechanism 18, and the high speed status of the forward travel speed change mechanism 17.

In addition, in a forward travel state where the shuttle lever 26 is operated to a forward travel position, forward travel drive power from the forward/reverse travel switching mechanism 16 is routed through the forward travel speed change mechanism 17, and therefore a speed change status of the forward travel speed change mechanism 17 takes effect. As a result, as shown in FIG. 5, an exemplary speed change status of the main speed change module 21 becomes capable of selecting and switching between twelve stages of forward travel speed change statuses corresponding to each of the operation positions of the twelve steps of the main speed change lever 25. Meanwhile, in a reverse travel state where the shuttle lever 26 is operated to a reverse travel position, reverse travel drive power from the forward/reverse travel switching mechanism 16 is not routed through the forward travel speed change mechanism 17, and therefore a speed change status of the forward travel speed change mechanism 17 is nullified. As a result, as shown in FIG. 6, an exemplary speed change status of the main speed change module 21 becomes capable of selecting and switching between eight stages of reverse travel speed change statuses corresponding to predetermined operation positions from among the operation positions of the twelve steps of the main speed change lever 25. When the main speed change lever 25 is operated to a neutral position, the main speed change module 21 is operated so as to obtain an OFF status of the travel clutch 15. Accordingly, a blocked status in which transmission of the travel drive power is blocked is obtained as the speed change status of the main speed change module 21.

As shown in FIGS. 7 to 12, the height setting lever 28 is supported by a support frame 36, which is positioned between the right rear fender 6 and the driver's seat 32. The support frame 36 is mounted to the right rear fender 6. The support frame 36 includes, for example, a first support member 37 oriented forward and outward to the right, which is positioned so as to be further outward to the right of the vehicle body toward the front; a second support member 38 having a band shape extending rearward from a rear bottom portion of the first support member 37, along a front/back direction of the vehicle body; a third support member 39 oriented forward and outward to the right along the first support member 37 and positioned at a front top portion of the second support member 38; and an arched guard member 40 positioned on a top portion of a left end of the first support member 37.

The height setting lever 28 includes, for example, a boss portion 28A (see FIG. 9) engaged around an exterior of a support shaft 41, which is orthogonal to a vertical wall 37A of the first support member 37. A human-operated operation portion 28B extends upward from the boss portion 28A. A link 28C extends rearward from the boss portion 28A. The height setting lever 28 is a finger shift type lever pivoting forward and backward, with the support shaft 41 acting as a fulcrum, and in which the operation portion 28B extends a short length from the boss portion 28A. The height setting lever 28 is capable of holding at a desired operation position due to a friction type first retention mechanism 42 (see FIG. 8) interposed between the boss portion 28A and the support shaft 41. The link 28C is swingably coupled to a detection arm 44 fixed to a detection shaft 43A of a first sensor 43. The link 28C includes, at a free end, an elongated hole or slot 28D that is linked to the detection arm 44.

The first sensor 43 is supported by a third support member 39. With this support, the first sensor 43 is positioned to the rear of the height setting lever 28 in a posture where the detection shaft 43A is parallel to the support shaft 41 of the height setting lever 28. The first sensor 43 can be a rotation type potentiometer. The detection arm 44 includes, on the free end, a linking pin 44A oriented in the left/right direction and inserted through the elongated hole 28D of the link 28C. Linking the elongated hole 28D and the linking pin 44A allows relative displacement between the link 28C and the detection arm 44 associated with the coupled pivoting of the link 28C and the detection arm 44.

With the above configuration, an operation position of the height setting lever 28 can be detected by the first sensor 43. In addition, the stepless position retaining type first lever module 45 is configured by the height setting lever 28, the first retention mechanism 42, the first sensor 43, and the like.

Although not shown in the drawings, the first sensor 43 outputs the detected operation position of the height setting lever 28 to the control device. By controlling operations of the lift apparatus 10 based on a detection from the first sensor 43 or the like, the control device drives the work apparatus to lift and lower to a height position corresponding to the operation position of the height setting lever 28. Accordingly, position control is possible in which the work apparatus is positioned at the height position corresponding to the operation position of the height setting lever 28.

As shown in FIGS. 7 to 12, the support frame 36 supports the first lever module 45 and also the stepwise position retaining type second lever module 46. The second lever module 46 includes, for example, the main speed change lever 25 which pivots stepwise forward and backward through twelve stepped operation positions, and a detent type second retention mechanism 47 holds the main speed change lever 25 at each of the operation positions. The second retention mechanism 47 includes, for example, a coupling member 48 interlocking with the main speed change lever 25, and a retention member 49 holding the main speed change lever 25 via the coupling member 48.

The retention member 49 has a fan shape and is formed with a plurality of lever holding recesses 49A on an arced outside edge portion on a top side of the retention member 49, with the recesses 49A corresponding to the operation positions of the main speed change lever 25. A bottom portion of the retention member 49 is fixed to the second support member 38 of the support frame 36.

The coupling member 48 pivots forward and backward with a support shaft 49B as a fulcrum, the support shaft 49B being provided to a bottom portion of the retention member 49 and oriented in the left/right direction. The coupling member 48 includes, at the free end, a swing arm 51 pivoting up and down with a support shaft 50 oriented in the left/right direction as a fulcrum, and a tension spring 52 biasing the swing arm 51 to descend. The swing arm 51 includes, at a free end, a lever holding pin 53 oriented in the left/right direction. The lever holding pin 53 selectively enters each of the recesses 49A of the retention member 49 through an operation of the tension spring 52.

The main speed change lever 25 and the second retention mechanism 47 are provided or are arranged separated from each other, and aligned with the front/back direction which intersects with a pivot support shaft 54 of the main speed change lever 25. Therefore, in the second lever module 46, the main speed change lever 25 and the coupling member 48 of the second retention mechanism 47 are reciprocally linked on opposite sides of a linking mechanism 55. Accordingly, a left/right direction width of the second lever module 46 can be made narrower in comparison to a configuration in which the main speed change lever 25 and the second retention mechanism 47 are integrally provided aligned in the left/right direction. In addition, in comparison to the case where the main speed change lever 25 and the second retention mechanism 47 are configured to be integral, a degree of freedom in placement of the main speed change lever 25 and the second retention mechanism 47 is increased. Accordingly, in a case where the main speed change lever 25 and the second retention mechanism 47 are provided together, collected in the first console 34 together with the height setting lever 28 and the like, even when a sufficiently broad space cannot be ensured to allow the main speed change lever 25 to be provided integrally with the second retention mechanism 47 in the first console 34 due to equipment such as the height setting lever 28, by ensuring sufficient space to allow the main speed change lever 25 and the second retention mechanism 47 to be provided separately, the main speed change lever 25 and the second retention mechanism 47 can be provided together, collected in the first console 34 together with the height setting lever 28 and the like. In addition, even when the main speed change lever 25 and the second retention mechanism 47 are provided separately, the main speed change lever 25 and the coupling member 48 of the second retention mechanism 47 are reciprocally connected via the linking mechanism 55, and therefore the second retention mechanism 47 is capable, via the linking mechanism 55, of stepwise retention of the main speed change lever 25 at each of the operation positions. Moreover, the main speed change lever 25 and the second retention mechanism 47 can be provided to a narrow space between the driver's seat 32 and the right rear fender 6 without difficulty and without inconvenience that may arise in a case where the main speed change lever 25 and the second retention mechanism 47 are provided separately, aligned in the vertical direction, such as a space at the driver's feet becoming narrowed and cramped due to the second retention mechanism 47 being provided below the main speed change lever 25.

As shown in FIG. 3, the main speed change lever 25 is positioned on a front end side of the first console 34. The height setting lever 28 is positioned at a location to the right and rear of the main speed change lever 25 in the first console 34. The lift switch 29 is positioned at a location rearward of the main speed change lever 25 in the first console 34. The PTO switch 30 is positioned at a location to the right of the main speed change lever 25 in the first console 34. Three auxiliary levers 33 are positioned at a location to the right and rear of the height setting lever 28 in the first console 34.

As shown in FIG. 3 and FIGS. 7 to 12, the main speed change lever 25 pivots forward and backward with the pivot support shaft 54, which is orthogonal to the vertical wall 37A of the first support member 37, as the fulcrum. Accordingly, an operation direction of the main speed change lever 25 is defined as a direction oriented forward and outward to the right, moving further outward laterally from the vehicle body as the main speed change lever 25 is operated toward the front of the vehicle body. In addition, by defining the operation direction of the main speed change lever 25 in this way, operation of the main speed change lever 25 while seated in the driver's seat 32 is facilitated as compared to a case where the operation direction of the main speed change lever 25 is defined in the front/back direction along the front/back direction of the vehicle body.

With reference to FIGS. 1 and 3, a side cover 56 is mounted to the right rear fender 6, with the side cover 56 covering the support frame 36, the pivot fulcrum side of the main speed change lever 25, and the pivot fulcrum side of the height setting lever 28, for example, from an interior of the vehicle body. The side cover 56 includes a front wall 56A on a driver's seat side, facing the pivot fulcrum side of the main speed change lever 25 and oriented forward and outward to the right along the operation direction of the main speed change lever 25. Accordingly, despite providing the main speed change lever 25 and the like together, collected in the first console 34, a broader boarding area toward the front right of the driver's seat 32 can be ensured, facilitating boarding and disembarking into and out of the cockpit 7 from the right side of the vehicle body. In addition, foot depression operation of the accelerator pedal 31, which is positioned on the floor portion at a forward location obliquely to the right of the driver's seat 32, is also facilitated.

As shown in FIGS. 7 to 12, with the finger shift model, which has a short extension length from the pivot support shaft 54, the main speed change lever 25 is provided with a narrowly defined pivot range. Therefore, compared to a case where the main speed change lever 25 is a hand shift model having a long extension length from the pivot support shaft 54, or a case where the pivot range is defined broadly, reduction in the size of the main speed change lever 25 is possible, and the space required for installation of the main speed change lever 25 can be narrowed. As a result, the degree of freedom in placing the main speed change lever 25 can be improved.

In the second retention mechanism 47, the coupling member 48 has an extension length from the support shaft 49B (pivot support shaft of the coupling member 48) that is defined to be short, having a length similar to the extension length of the main speed change lever 25 from the pivot support shaft 54. The retention member 49 has a spacing between each of the lever holding recesses 49A that is defined to be shorter in response to a pivot range of the main speed change lever 25. Therefore, compared to a case where the second retention mechanism 47 accommodates the hand shift model main speed change lever 25 or the main speed change lever 25 having a broad pivot range, reduction in the size of the second retention mechanism 47 is possible, and the space required for installation of the second retention mechanism 47 can be narrowed. As a result, the degree of freedom in placing the second retention mechanism 47 can be improved.

The second lever module 46 includes a friction applying mechanism 58 applying frictional resistance to operation of the main speed change lever 25. Accordingly, an unnecessarily rapid operation of the main speed change lever 25 can be prevented. As a result, a step-skipping operation of the main speed change lever 25 can be prevented with respect to the retention member 49 of the second retention mechanism 47, in which the interval between each of the lever holding recesses 49A is reduced. In such a step-skipping operation, the pin 53 of the coupling member 48 skips over the recess 49A targeted by the operation, which may occur in cases where the coupling member 48 swings rapidly in conjunction with rapid operation of the main speed change lever 25. Specifically, an incorrect operation of the main speed change lever 25 caused by reduction in size of the second retention mechanism 47 can be prevented.

Figure 10:
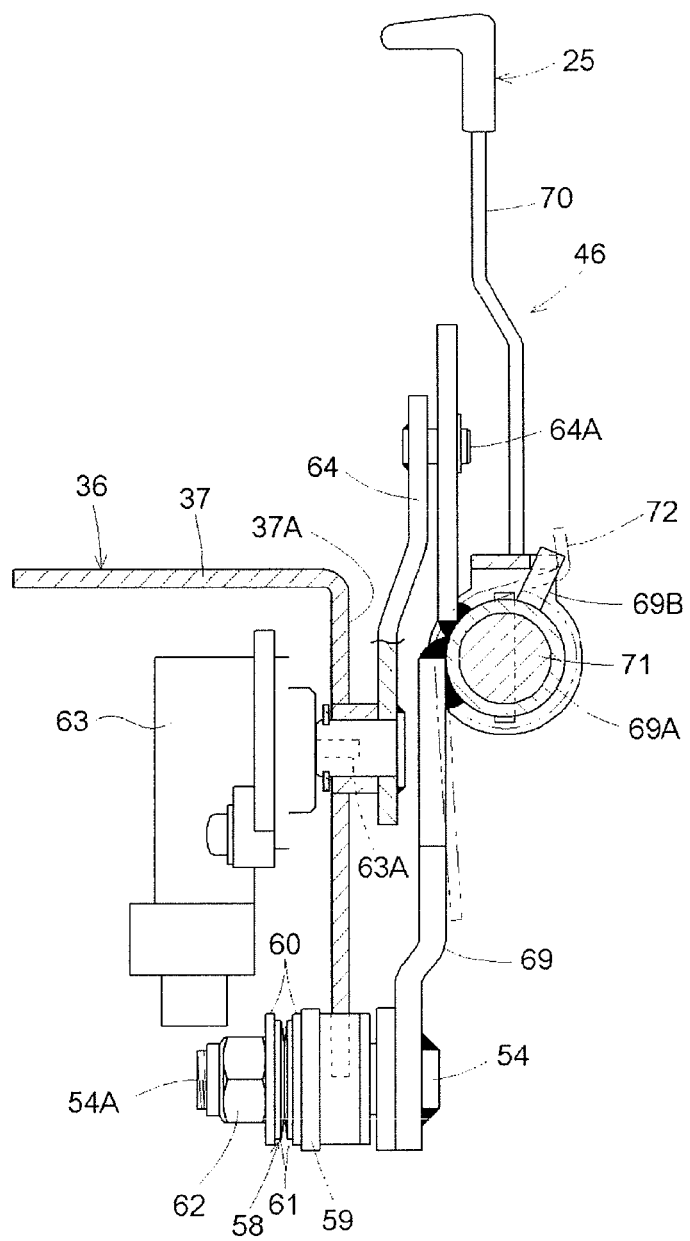
FIG. 10 is a vertical cross-sectional front view of relevant portions illustrating a configuration of the main speed change lever as well as a structure linking the main speed change lever with a second sensor.
Figure 11:
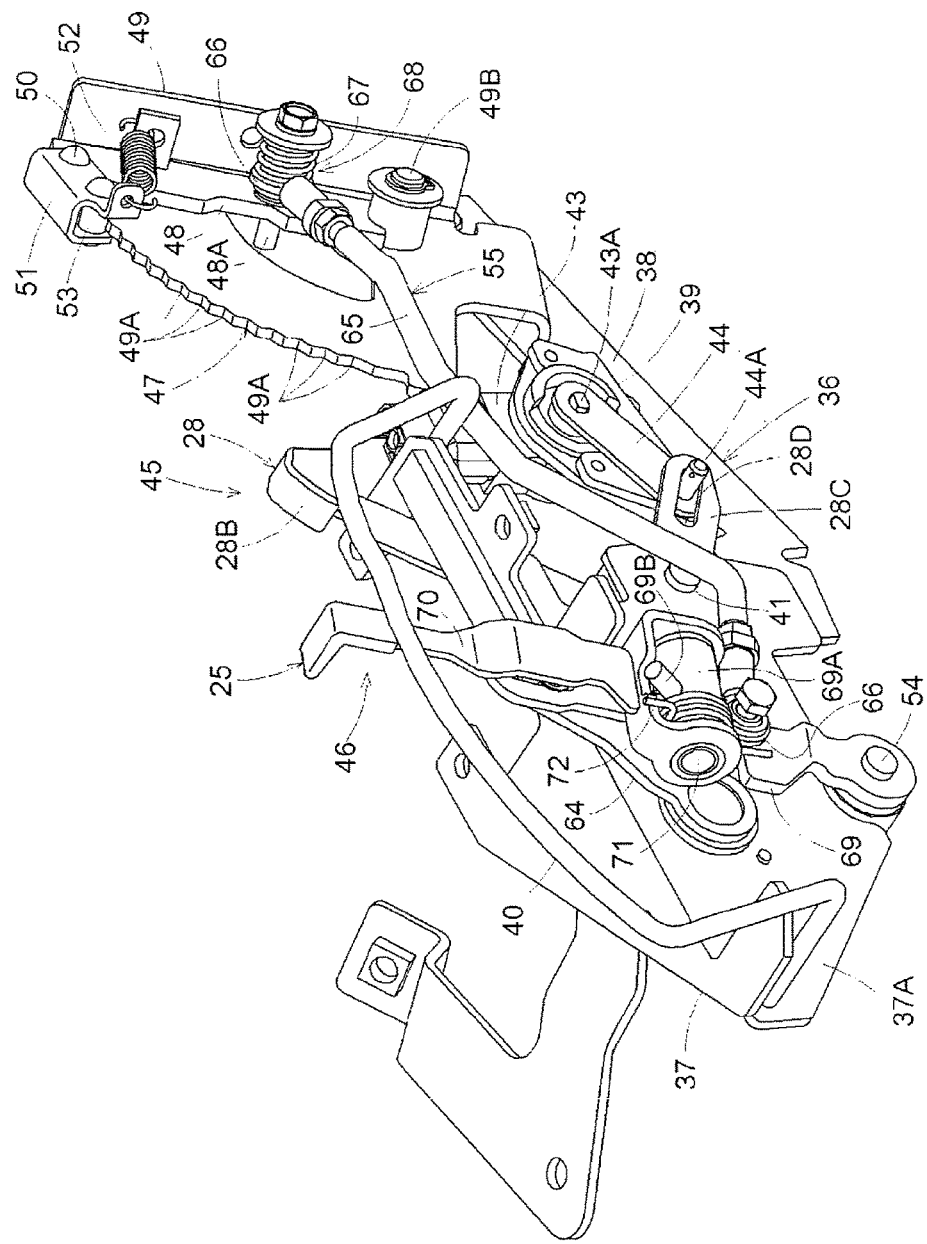
FIG. 11 is a perspective view of relevant portions illustrating the configuration of the stepless position retaining type first lever module and the stepwise position retaining type second lever module.
Figure 12:
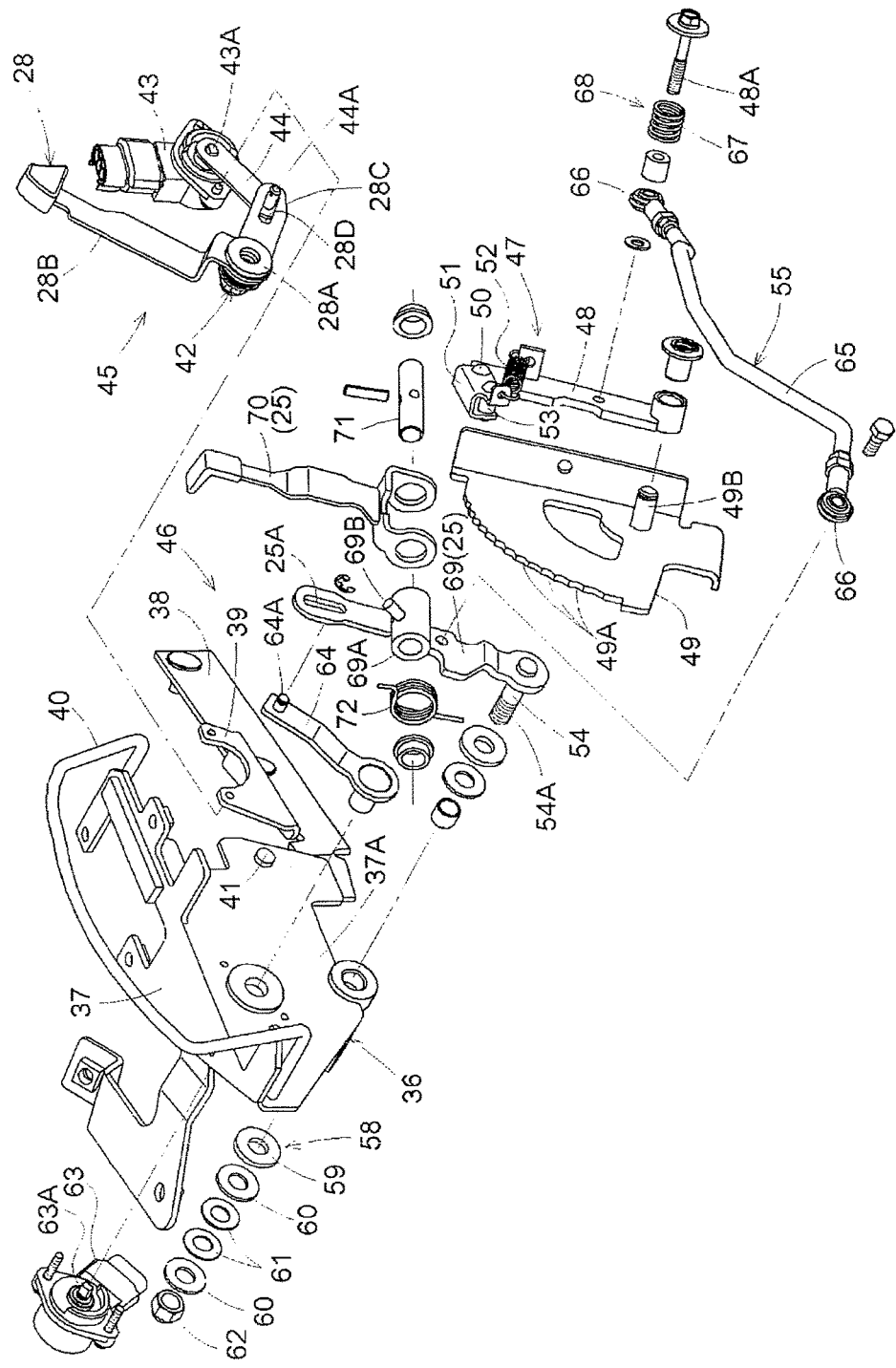
FIG. 12 is an exploded perspective view of relevant portions illustrating the configuration of the stepless position retaining type first lever module and the stepwise position retaining type second lever module.

As shown in FIGS. 10 and 12, the friction applying mechanism 58 includes a friction plate 59, a pair of flat washers 60, a pair of plate springs 61, and a nut 62, for example. The friction plate 59, the pair of flat washers 60, and the pair of plate springs 61 are fitted around an exterior of the pivot support shaft 54 of the main speed change lever 25. The nut 62 is screwed onto a male threaded portion 54A of the pivot support shaft 54. Accordingly, the friction applying mechanism 58 enables adjustment of frictional resistance applied to an operation of the main speed change lever 25 by adjusting how far the nut 62 is screwed onto the male threaded portion 54A of the pivot support shaft 54.

As shown in FIGS. 7 to 12, the second lever module 46 includes a second sensor 63 detecting the operation position of the main speed change lever 25. The second sensor 63 can be a rotation-type potentiometer. The second sensor 63 is mounted to the first support member 37 in a posture where the detection shaft 63A of the second sensor 63 is orthogonal to the vertical wall 37A of the first support member 37. The second sensor 63 is provided at a height position where the detection shaft 63A is located above the pivot support shaft 54 of the main speed change lever 25. The detection arm 64, which is swingably coupled to the main speed change lever 25, is fixed to the detection shaft 63A of the second sensor 63. Accordingly, an operation angle of the detection arm 64 relative to the operation angle of the main speed change lever 25 can be increased as compared to a case where the detection shaft 63A of the second sensor 63 and the pivot support shaft 54 of the main speed change lever 25 are provided coaxially. Thus, an amount of change in a voltage value, which changes accompanying modification of the operation position of the main speed change lever 25, can be increased. As a result, the position of the main speed change lever 25 can be accurately detected using the rotation type potentiometer as the second sensor 63 while reducing the size of the main speed change lever 25.

The main speed change lever 25 includes an elongated hole 25A linking with the detection arm 64. The detection arm 64 includes, on the free end, a laterally oriented linking pin 64A inserted through the elongated hole 25A of the main speed change lever 25. The link between the elongated hole 25A and the linking pin 64A allows relative displacement between the main speed change lever 25 and the detection arm 64 associated with the coupled pivoting of the main speed change lever 25 and the detection arm 64.

As shown in FIGS. 7 to 12, the main speed change lever 25 is positioned on a vehicle body front side of the first lever module 45. The second retention mechanism 47 is positioned on a vehicle body rear side of the first lever module 45. The linking mechanism 55 includes a rod 65 formed in a curving shape which bypasses the first lever module 45 and the like in order to avoid interfering with components such as the first lever module 45 positioned between the main speed change lever 25 and the second retention mechanism 47.

As described above, the operation direction of the main speed change lever 25 is defined as the direction oriented forward and outward to the right. In the second retention mechanism 47, the installation posture of the retention member 49 is defined as a posture oriented in the front/back direction in which each of the lever holding recesses 49A lie along the front/back direction of the vehicle body. The pivot direction of coupling member 48 is defined in the front/back direction along the front/back direction of the vehicle body. Therefore, the linking mechanism 55 includes, at both ends of the rod 65, a ball joint 66 linking with one of the main speed change lever 25 and the coupling member 48. This configuration enables the main speed change lever 25 and the coupling member 48, which have different pivot directions, to be coupled smoothly.

The coupling member 48 includes a biasing mechanism 68 on a coupling shaft 48A which couples to the linking mechanism 55, the biasing mechanism 68 biasing the ball joint 66 on a rear end of the rod 65 toward the coupling member 48 through an operation of a compression spring 67. Accordingly, displacement of the rod 65 due to flexibility of the ball joint 66 at the rear end of the rod 65 is regulated and the rod 65 is prevented from interfering with the first lever module 45, for example, due to such displacement.

With reference to FIGS. 3, 4, and 7 to 12, the side cover 56 includes, on a top surface, a first guide groove 56B used with the main speed change lever 25 and a second guide groove 56C used with the height setting lever 28, for example. The first guide groove 56B includes a neutral position holder 56a, a first guide portion 56b, a second guide portion 56c, and a third guide portion 56d. The neutral position holder 56a enables the main speed change lever 25 to be held at a neutral position. The first guide portion 56b guides the main speed change lever 25 in a case where the main speed change lever 25 is operated to swing between the neutral position and the forward travel speed 8 position or the reverse travel speed 4 position. The second guide portion 56c guides the main speed change lever 25 in a case where the main speed change lever 25 is operated to swing between the forward travel speed 8 position and the forward travel speed 9 position, or between the reverse travel speed 4 position and the reverse travel speed 5 position. The third guide portion 56d guides the main speed change lever 25 in a case where the main speed change lever 25 is operated to swing between the forward travel speed 9 position and the forward travel speed 12 position, or between the reverse travel speed 5 position and the reverse travel speed 8 position.

The neutral position holder 56a extends in the vehicle body rightward direction, orthogonal to the first guide portion 56b, from the neutral position of the first guide portion 56b. Accordingly, in a state where the main speed change lever 25 is positioned at the neutral position holder 56a, mistaken operation of the main speed change lever 25 from the neutral position into an acceleration direction can be prevented.

The first guide portion 56b and the third guide portion 56d are arranged or formed in a straight line shape. The second guide portion 56c is formed in a crank shape, and thus is configured to extend operation time required for a swing operation of the main speed change lever 25 between the forward travel speed 8 position and the forward travel speed 9 position, or between the reverse travel speed 4 position and the reverse travel speed 5 position. Accordingly, given the structure of the main speed change module 21, a speed change motion of the main speed change module 21 between forward travel speed 8 and forward travel speed 9 or between reverse travel speed 4 and reverse travel speed 5, which takes more time as compared to other speed change motions, is prevented from taking longer than a pivot operation of the main speed change lever 25 between the forward travel speed 8 position and the forward travel speed 9 position or between the reverse travel speed 4 position and the reverse travel speed 5 position.

As shown in FIGS. 7 to 12, the main speed change lever 25 includes a base end lever member 69 and a free end lever member 70, for example. The main speed change lever 25 includes the elongated hole 25A linking with the second sensor 63 on the free end side of the base end lever member 69. The base end lever member 69 extends upward from the pivot support shaft 54 and includes a boss portion 69A at a vertically intermediate portion. The free end lever member 70 has a bottom end portion straddling the boss portion 69A, and is coupled at the bottom end portion to the boss portion 69A via a support shaft 71 oriented orthogonally to the pivot support shaft 54. Thus, the free end lever member 70 is capable of pivot operation relative to the base end lever member 69, with the support shaft 71 as a fulcrum. A torsion spring 72 is fitted around an exterior of the boss portion 69A, the torsion spring 72 pivoting and biasing the free end lever member 70 in the vehicle body rightward direction. The boss portion 69A includes an extension 69B extending outward to the left of the free end lever member 70. A pivoting range of the free end lever member 70 is defined between a right boundary position where the bottom end of the free end lever member 70 touches the base end lever member 69 and a left boundary position where the bottom end of the free end lever member 70 touches the extension 69B. This enables pivot operation of the main speed change lever 25 along the first guide groove 56B. In addition, in a case where the main speed change lever 25 is located in the neutral position, the main speed change lever 25 is held at the neutral position holder 56a by an operation of the torsion spring 72.

As shown in FIGS. 7 to 12, the guard member 40 is positioned on a left side of the main speed change lever 25 and the height setting lever 28. Specifically, mistaken operation of the main speed change lever 25 or the height setting lever 28 caused by the driver inadvertently touching the main speed change lever 25 or the height setting lever 28 is prevented by the guard member 40.

Other Embodiments

The present invention is not limited to the configurations exemplified in the embodiment described above. Hereafter, other exemplary embodiments are described which are representative of the present invention.

(1) In the present invention, the operation lever 25 may be the height setting lever 28, may include the detent type retention mechanism 47 holding the height setting lever 28 at a plurality of operation positions, and may be applied to a work vehicle configured so as to perform stepwise definition of the height of the work apparatus.

(2) In the present invention, the operation lever 25 may be a continuously variable transmission speed change lever, may include the detent type retention mechanism 47 holding the speed change lever at a plurality of operation positions, and may be applied to a work vehicle capable of pseudo-stepwise speed change operations of the continuously variable transmission.

(3) The present invention may be applied to a work vehicle in which the operation lever 25 and the detent type retention mechanism 47, along with the creep lever 27, for example, are arranged on or provided to the second console 35, which is provided at a location forward and to the left of the driver's seat 32.

(4) The present invention may be applied to a work vehicle in which the operation lever 25, the detent type retention mechanism 47, and the like are installed within left and right armrests provided to the left and right of the driver's seat 32.

(5) A number of operation steps of the operation lever 25 and a number of recesses 49A on the detent type retention mechanism 47 can be variously modified in response to a configuration of the transmission to be operated by the operation lever 25.

(6) The detent type retention mechanism 47 may have a configuration in which the coupling member 48 has a fan shape and is formed with the plurality of lever holding recesses 49A on the arced outside edge portion on the top side of the coupling member 48, with the recesses 49A corresponding to the operation positions of the main speed change lever 25, and in which the retention member 49 includes for example the swing atm 51 having the lever holding pin 53, and the tension spring 52 biasing the swing arm 51 to pivot toward the recesses 49A of the coupling member 48.

(7) The detent type retention mechanism 47 may have a configuration in which the operation lever 25 and the retention mechanism 47 are provided separately, in a state aligned in the vertical direction of the vehicle body.

(8) The operation lever 25 may have the operation direction defined in the front/back direction along the front/back direction of the vehicle body.

(9) The operation lever 25 may be the hand shift model, having a long extension length from the pivot support shaft 54.

(10) The linking mechanism 55 may have a shape in which the rod 65 spans between the operation lever 25 and the coupling member 48 in a straight line.

(11) The biasing mechanism 68 may be omitted from the linking mechanism 55.

The present invention can be applied to a work vehicle which includes an operation lever pivoting forward and backward stepwise through a plurality of operation positions and a detent type retention mechanism holding the operation lever in each of the operation positions. Examples of such a vehicle include a tractor, a riding rice transplanter, a riding mower, a combine, and a transport vehicle.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
   an operation lever configured to pivot about a pivot support shaft between a plurality of operation positions;
   a detent retention mechanism releasably retaining the operation lever in each of the operation positions;
   a coupling member;
   a retention member; and
   a linking mechanism connecting the operation lever to the detent retention mechanism,
   wherein the operation lever and the detent retention mechanism are at least one of:
      separate from one another; and
      spaced from each other;
   wherein the detent retention mechanism and the operation lever are spaced from each other in a front-back direction, and the detent retention mechanism includes recesses structured and arranged to be engaged and act as detents at a point spaced from the operation lever in a front-back direction to provide step-wise retention such that the operation lever pivots stepwise through operating positions,
   and wherein the operation lever is constructed and arranged to move in an operation direction oriented forward and left or right while the coupling member pivots in a front/back direction.

2. The work vehicle of claim 1, further comprising a driver's seat positioned between left and right rear fenders, wherein the operation lever and the detent retention mechanism are arranged between the driver's seat and one of the left and right rear fenders.

3. The work vehicle of claim 1, wherein the operation lever is located forward and outward of a seat back of a vehicle seat.

4. The work vehicle of claim 1, wherein the operation lever has a finger-engageable portion.

5. The work vehicle of claim 1, wherein the linking mechanism has one end connected to the coupling member and the coupling member is pivotally connected to the detent retention mechanism via a pivot support shaft.

6. The work vehicle of claim 1, wherein the linking mechanism has a first end coupled to the operation lever and a second end connected to the coupling member and the coupling member is pivotally connected to the detent retention mechanism via a pivot support shaft.

7. The work vehicle of claim 1, wherein the recesses are arranged on one of the coupling member and the retention member.

8. The work vehicle of claim 1, further comprising a friction applying mechanism configured to apply frictional resistance to movement or operation of the operation lever.

9. The work vehicle of claim 1, further comprising a sensor detecting a position of the operation lever.

10. The work vehicle of claim 9, wherein the sensor is at least one of:
    a potentiometer;
    a potentiometer located above the pivot support shaft of the operation lever;
    a potentiometer coupled to a detection arm; and
    a potentiometer coupled to the operation lever via a detection arm.

11. A work vehicle comprising:
    a pivotally mounted operation lever having a user-grippable portion and pivoting about a first pivot axis;
    a pivotally mounted coupling member spaced from the operation lever and pivoting about a second pivot axis;
    a detent retention mechanism coupled to the coupling member and releasably retaining the operation lever in each of plural operation positions;
    a linking mechanism;
    a first movable connection connecting the operation lever to the linking mechanism; and
    a second movable connection connecting the coupling member to the linking mechanism,
       wherein the first movable connection is spaced from the first pivot axis by an amount that is less than an overall length of the operation lever and the second movable connection is spaced from the second pivot axis by an amount that is less than an overall length of the coupling member;
    wherein the detent retention mechanism and the operation lever are spaced from each other in a front-back direction, and the detent retention mechanism includes recesses structured and arranged to be engaged and act as detents at a point spaced from the operation lever in a front-back direction to provide step-wise retention such that the operation lever pivots stepwise through operating positions, and wherein the operation lever is constructed and arranged to move in an operation direction oriented forward and left or right while the coupling member pivots in a front/back direction.

12. The work vehicle of claim 11, wherein the linking mechanism is a rod with bends.

13. The work vehicle of claim 11, wherein the first movable connection is spaced closer to the first pivot axis than to an upper end of the operation lever and the second movable connection is spaced closer to the second pivot axis than to an upper end of the coupling member.

14. A work vehicle comprising:
a support member;
a first operation lever pivotally mounted to the support member and having a user engageable or grippable portion;
a second operation lever pivotally mounted to the support member and having a user engageable or grippable portion;
a pivotally mounted coupling member spaced from the first operation lever;
a detent retention mechanism coupled to the coupling member and releasably retaining the first operation lever in each of plural operation positions;
a linking mechanism;
a first connection connecting the first operation lever to the linking mechanism; and
a second connection connecting the coupling member to the linking mechanism,
wherein the first operation lever operates speed changing of the work vehicle and the second operation lever operates a work device of the work vehicle;
wherein the detent retention mechanism and the first operation lever are spaced from each other in a front-back direction, and the detent retention mechanism includes recesses structured and arranged to be engaged and act as detents at a point spaced from the first operation lever in a front-back direction to provide step-wise retention such that the first operation lever pivots stepwise through operating positions,
and wherein the first operation lever is constructed and arranged to move in an operation direction oriented forward and left or right while the coupling member pivots in a front/back direction.

15. The work vehicle of claim 14, wherein the second operation lever pivots along a front to back direction of the work vehicle.

16. The work vehicle of claim 14, wherein the first and second operation levers are at least one of:
located on opposite sides of the support member; and
each coupled to an electric or electronic sensor.

17. The work vehicle of claim 14, wherein the linking mechanism is a rod with bends.

* * * * *